(12) United States Patent
Thompson

(10) Patent No.: US 8,178,252 B2
(45) Date of Patent: May 15, 2012

(54) METHOD TO MAXIMIZE FUEL CELL VOLTAGE DURING START-UP

(75) Inventor: Eric L. Thompson, Livonia, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1142 days.

(21) Appl. No.: 11/956,972

(22) Filed: Dec. 14, 2007

(65) Prior Publication Data
US 2009/0155634 A1   Jun. 18, 2009

(51) Int. Cl.
*H01M 8/04* (2006.01)
(52) U.S. Cl. .......................................... 429/431
(58) Field of Classification Search ............ 429/429, 429/431
See application file for complete search history.

(56) References Cited

U.S. PATENT DOCUMENTS

| | | | |
|---|---|---|---|
| 7,318,971 B2 * | 1/2008 | Imamura et al. | 429/431 |
| 7,867,642 B2 * | 1/2011 | Falta | 429/428 |

* cited by examiner

*Primary Examiner* — Ula C. Ruddock
*Assistant Examiner* — Thomas H. Parsons
(74) *Attorney, Agent, or Firm* — Fraser Clemens Martin & Miller LLC; J. Douglas Miller

(57) ABSTRACT

A method of operating a fuel cell system is disclosed, the method including the steps of providing a fuel cell stack including a plurality of fuel cell assemblies, each fuel cell assembly having a proton exchange membrane disposed between a plurality of fuel cell plates, wherein water is purged from the fuel cell system during a shutdown operation, and a current is produced in the fuel cell system following the shutdown purge to produce product water to hydrate the proton exchange membrane.

19 Claims, 2 Drawing Sheets

METHOD TO MAXIMIZE FUEL CELL VOLTAGE DURING START-UP

FIELD OF THE INVENTION

This invention relates to a method of operating a fuel cell system, and more particularly, to a method of operating a fuel cell system to optimize a start-up operation of the fuel cell system at temperatures which may cause a freezing of water in the fuel cell system.

BACKGROUND OF THE INVENTION

Fuel cell systems convert a fuel and an oxidant to electricity in a fuel cell stack. One type of fuel cell system employs a proton exchange membrane (hereinafter "PEM") to catalytically facilitate reaction of the fuel (such as hydrogen) and the oxidant (such as oxygen or air) to generate electricity. The PEM is a solid polymer electrolyte membrane that facilitates transfer of protons from an anode to a cathode in each individual fuel cell assembly of the fuel cell system. Electrodes, a catalyst, and the PEM are assembled to form a membrane electrode assembly (MEA).

In a typical PEM fuel cell assembly, the MEA is disposed between gas diffusion media (GDM). The GDM and MEA are disposed between a pair of electrically conductive plates. If the plates are bipolar plates, the plates conduct current between adjacent fuel cell assemblies in the fuel cell system. If the plates are unipolar plates at an end of a stack of fuel cell assemblies, the plates conduct current externally of the fuel cell assemblies.

Individual fuel cell assemblies include channels formed therein to facilitate a flow of the reactants and a cooling fluid therethrough. Fuel cell plates are typically designed with serpentine flow channels. Serpentine flow channels are desirable as they effectively distribute reactants over an active area of the fuel cell assembly, thereby maximizing performance and stability of the fuel cell assembly. Movement of water from the flow channels to outlet manifolds of the fuel cell plates is caused by the flow of the reactants through the fuel cell assembly. Water in PEM fuel cell systems may accumulate and form ice in subfreezing conditions. Repeated freezing and thawing of the PEM may reduce a useful life of the PEM. Additionally, a time required for a start-up operation of the fuel cell system is increased due to the presence of water and ice in the fuel cell system. A warm-up and drive away time of a vehicle including the fuel cell system is also increased.

Typically, a draining operation is used to remove the water in the manifolds of the fuel cell system during a shutdown operation. Water that remains in the fuel cell system after the draining operation may be removed from the fuel cell system with a shutdown purge. The shutdown purge may be a vacuum evaporation, an air purge, a cessation of the humidification of the reactants, or other similar fuel cell assembly humidity starvation methods known in the art.

To maintain high proton conductance and low internal resistance in the fuel cell system during a startup operation and normal operation, the PEM must maintain a desired level of hydration. Conventional shutdown purge procedures are typically intended to remove liquid from the flow channels of the fuel cell plates, GDM, electrode pores, and the PEM of the fuel cell system. Adequate removal of liquid water (from flow channels for example) often requires long purge durations, such that the process of moisture removal from the PEM results in an undesirable drying out of the PEM to a level below the desired level of hydration. A typical PEM will have a hydration index ($\lambda$) of approximately nine. The hydration index is defined as the number of moles of water per equivalent sulfonic acid group in the PEM. Following conventional shutdown purge operations, the PEM may have a hydration index below 3.5. If the hydration index of the PEM is less than nine, an Ohmic (voltage) loss in the fuel cell assembly will occur. Ohmic loss is defined as a voltage drop created by resistance to a flow of ions in the PEM and resistance to a flow of electrons through the electrode and the bipolar plate materials. During start-up operations in cold or freezing conditions, a hydration index less than nine may result in an increased Ohmic (voltage) loss in the fuel cell system, thereby further increasing the warm-up and drive away times.

It would be desirable to develop a method of operating a fuel cell system to optimize a start-up operation of the fuel cell system at temperatures which may cause a freezing of water in the fuel cell system.

SUMMARY OF THE INVENTION

Concordant and consistent with the present invention, a method of operating a fuel cell system to optimize a start-up operation of the fuel cell system at temperatures which may cause a freezing of water in the fuel cell system, has surprisingly been discovered.

In one embodiment, the method of operating a fuel cell system comprises the steps of providing a fuel cell stack including a plurality of fuel cell assemblies, each fuel cell assembly having a proton exchange membrane disposed between a plurality of fuel cell plates; purging water from the fuel cell system during a shutdown operation; and operating the fuel cell system following the shutdown purge to produce product water, wherein the product water hydrates the proton exchange membrane to militate against an Ohmic loss across the fuel cell assemblies during a start-up operation of the fuel cell system.

In another embodiment, the method of operating a fuel cell system comprises the steps of providing a fuel cell stack including a plurality of fuel cell assemblies, each fuel cell assembly having a proton exchange membrane disposed between a plurality of fuel cell plates; purging water from the fuel cell system during a shutdown operation; producing a current in the fuel cell system with a current operation following the shutdown purge to produce product water therein, wherein the water produced hydrates the proton exchange membrane to militate against an Ohmic loss across the fuel cell assemblies during a start-up operation of the fuel cell system; and providing a means for regulating the current flow, wherein the current is regulated in response to a High Frequency Response (HFR) signal.

In another embodiment, the method of operating a fuel cell system comprises the steps of providing a fuel cell stack including a plurality of fuel cell assemblies, each fuel cell assembly having a proton exchange membrane disposed between a plurality of fuel cell plates; purging water from the fuel cell system during a shutdown operation; producing a current in the fuel cell system with a current operation following the shutdown purge to produce product water therein, wherein the water produced hydrates the proton exchange membrane to militate against an Ohmic loss across the fuel cell assemblies during a start-up operation of the fuel cell system; and providing a means for regulating the current, wherein the current is produced for a desired duration to produce a desired amount of product water to achieve a desired hydration index ($\lambda$) of the proton exchange membrane.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
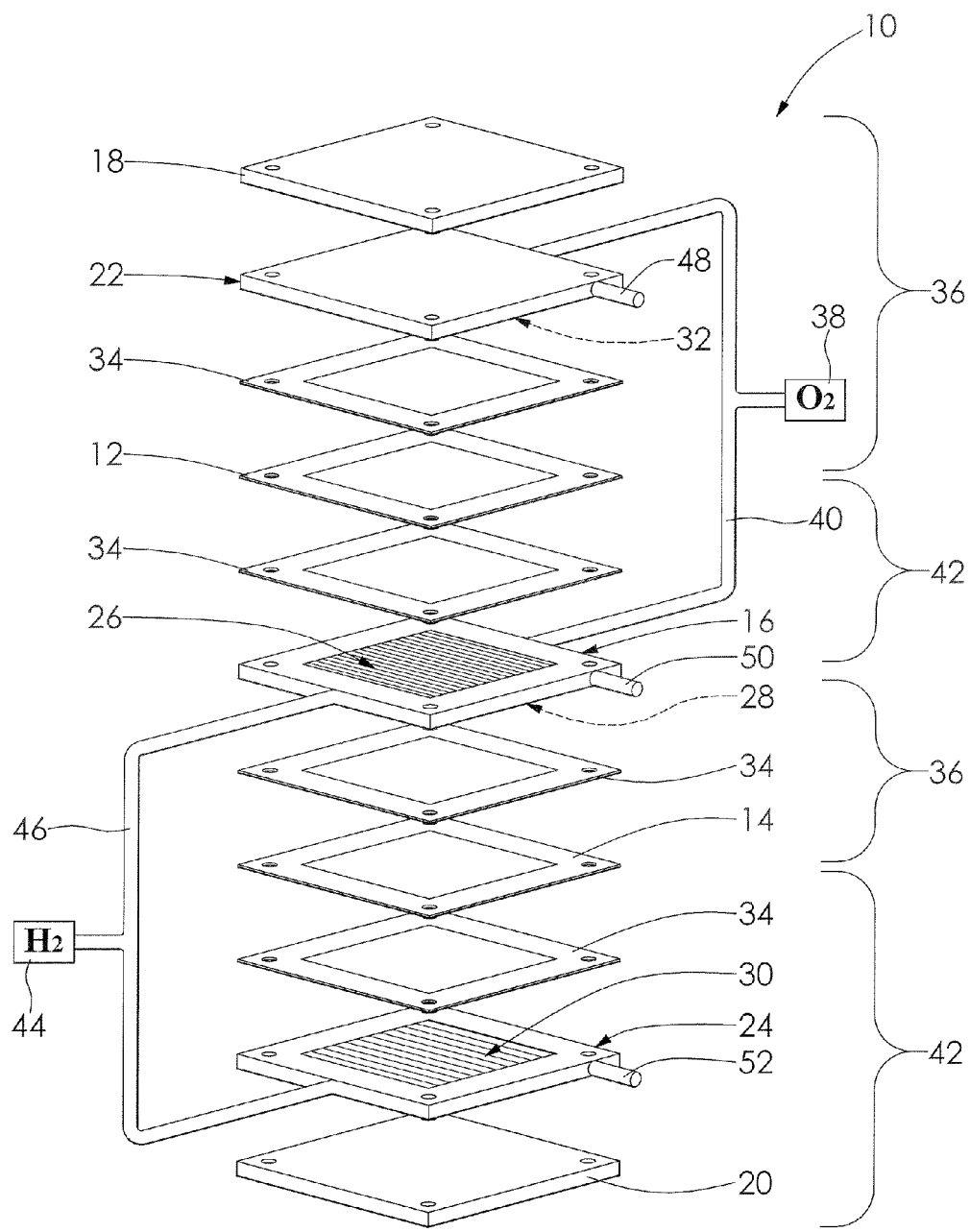
FIG. 1 is an exploded perspective view of a fuel cell stack including two fuel cell assemblies according to prior art.

FIG. 1 illustrates a fuel cell system 10 including two fuel cells according to prior art. However, it is understood that any number of fuel cells may be used in the fuel cell system 10, as desired. The fuel cell system 10 includes a pair of membrane-electrode-assemblies (MEAs) 12, 14 separated by a bipolar plate 16. The MEAs 12, 14 and bipolar plate 16 are stacked together between end plates 18, 20, and end contact elements 22, 24. The bipolar plate 16 and the end contact elements 22, 24 include working faces 26, 28, 30, 32, respectively, for distributing a fuel and an oxidant (e.g., $H_2$ and $O_2$, respectively) to the MEAs 12, 14. Nonconductive gaskets 34 provide seals and electrical insulation between the several components of the fuel cell system 10.

The MEAs 12, 14 are disposed adjacent gas permeable conductive materials known as gas diffusion media (not shown). The gas diffusion media may include carbon or graphite diffusion paper. As described herein, the gas diffusion media are adhered to the MEAs 12, 14. The end contact elements 22, 24 are disposed adjacent the diffusion media of the MEAs 12, 14. The bipolar plate 16 is disposed adjacent the diffusion media on an anode face of the MEA 12, and is also disposed adjacent the gas diffusion media on a cathode face of the MEA 14. Oxygen is supplied to the cathode side 36 of the fuel cell system 10 from an oxygen source 38, for example, via an appropriate supply conduit 40. Hydrogen is supplied to the anode side 42 of the fuel cell from a hydrogen source 44, for example, via an appropriate supply conduit 46. Alternatively, ambient air may be supplied to the cathode side as an oxygen source and hydrogen to the anode from a methanol or gasoline reformer, and the like. Exhaust conduits (not shown) for both the anode side 42 and the cathode side 36 of the MEAs 12, 14 are also provided. Additional conduits 48, 50, 52 are provided for supplying liquid coolant to the bipolar plate 16 and the end plates 18, 20. Appropriate conduits for exhausting coolant from the bipolar plate 16 and end plates 18, 20 are also provided (not shown).

Figure 2:
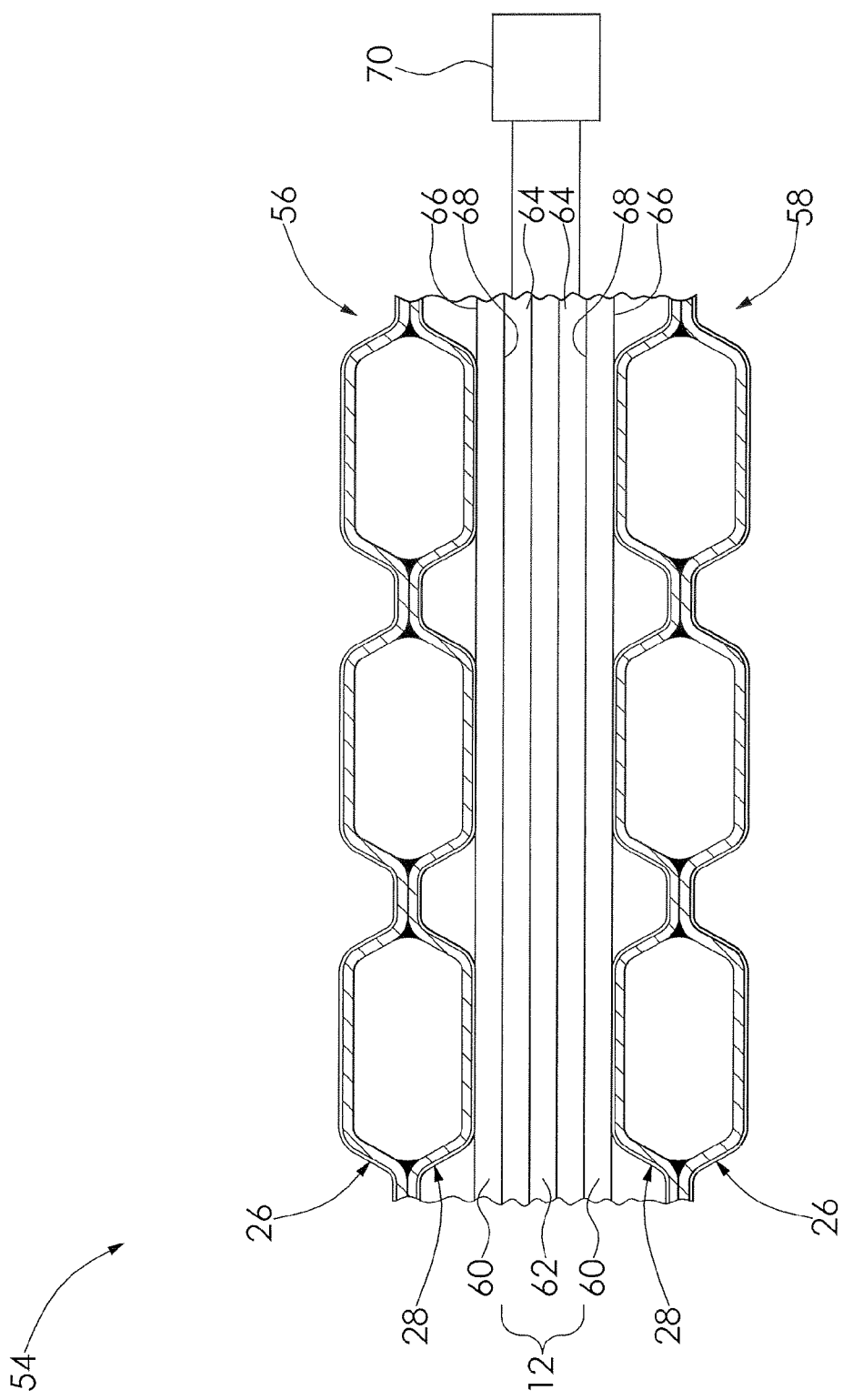
FIG. 2 is a fragmentary cross-sectional view of a fuel cell assembly.

Referring next to FIG. 2, a PEM fuel cell assembly 54 is illustrated. The fuel cell assembly 54 includes a first bipolar plate 56, a second bipolar plate 58, and a membrane electrode assembly (MEA) 12. The MEA 12 is disposed between diffusion media 60.

The MEA 12 includes a proton exchange membrane (PEM) 62 disposed between two catalyst layers 64. The PEM 62 is a thin, solid polymer membrane-electrolyte, but may be any conventional PEM 62, as desired. The catalyst layers 64 are formed from platinum supported on high-structure carbon in the illustrated embodiment, but may be any conventional catalyst such as a platinum-ruthenium catalyst, for example. It is understood that the MEA 12 may include a microporous layer (not shown) for increased current density and water management in the fuel cell assembly 54.

The diffusion media 60 include a first side 66 and a second side 68. One of the diffusion media 60 is disposed between the MEA 12 and the first bipolar plate 56, and the other of the diffusion media 60 is disposed between the MEA 12 and the second bipolar plate 58.

In use, hydrogen is supplied to the end contact element 24 and the anode side 42 of the bipolar plate 16 of the fuel cell system 10 from the hydrogen source 44 through the conduit 46. Oxygen is supplied as the oxidant to the end contact element 22 and the cathode side 36 of the bipolar plate 16 from the oxygen source 38 through the conduit 40. Alternatively, ambient air may be supplied to the cathode side 36 as an oxidant and hydrogen may be supplied to the anode side 42 from a methanol or gasoline reformer. At the anode side 42, the hydrogen is catalytically split into protons and electrons. The protons formed permeate through the PEM 62 to the cathode side 36. The electrons travel along an external load circuit (not shown) to the cathode side 36 of the MEA 12, thus creating a current output of the fuel cell system 10. Simultaneously, the stream of oxygen is delivered to the cathode side 36 of the MEA 12. At the cathode side 36, oxygen molecules react with the protons permeating through the PEM 62, and the electrons arriving through the external circuit to form product water. The water is susceptible to freezing when exposed to temperatures below the freezing point thereof.

During a shutdown operation of the fuel cell system 10, a purge operation may be performed to remove channel water, water slugs, and residual water from the MEA 12, and to militate against the formation of ice in subfreezing conditions. When the MEA 12 is dried, the PEM 62 is also dried. The PEM may reach a hydration index ($\lambda$) substantially near 3.5, where the hydration index is defined as the number of moles of water per equivalent sulfonic acid group (SO3-) in the PEM. When the ambient temperature is −20 degrees Celsius and the hydration index is at or above 9, the PEM 62 is considered sufficiently hydrated. It is understood that at ambient temperatures below −20 degrees Celsius, sufficient hydration of the PEM 62 is indicated by a lower hydration index (i.e. $\lambda$ is at or above 6) and at ambient temperatures above −20 degrees Celsius, sufficient hydration of the PEM 62 is indicated by a higher hydration index (i.e. $\lambda$ is at or above 10). Insufficient hydration exists when the hydration index is below nine for the PEM 62. When the PEM 62 is dried to a hydration index substantially below 9, undesirable Ohmic (voltage) losses may occur. The Ohmic losses may increase during a startup operation at temperatures near or below the freezing point of water.

To counteract the insufficient hydration and militate against the Ohmic loss, a current is produced in the fuel cell system 10 following the purge operation. The current is produced by briefly operating the fuel cell system 10. This brief operation is known as a current operation. The current operation is performed to generate a desired amount of product water in the fuel cell system 10 to hydrate the PEM 62. Hydrating the PEM 62 after the purge operation militates against Ohmic losses during the start-up operation. The desired amount of product water is an amount sufficient to hydrate the PEM 62 to a desired hydration index, without producing product water to a point where the water is overflowing into the catalyst layers 64. Favorable results have been obtained where the current produced in the fuel cell system 10 has a current density at or below 0.12 A/cm², although other current densities can be used as desired. For example, where a current density of 0.02 A/cm² requires a duration of 230 seconds to sufficiently hydrate the PEM 62, a current density of 0.05 A/cm² requires a duration of 92 seconds to sufficiently hydrate the PEM 62 in similar conditions. Where the current density is low, the duration of the current operation is longer to re-hydrate the PEM 62. However, if the current density is too high, the PEM will not absorb the product water as fast as the water is being created and the water will overflow into the catalyst layer, undoing the benefits accomplished by the purge. The current density of the current operation should not be greater than a rate at which the PEM can absorb the product water. The rate at which the PEM can absorb water is dependent upon characteristics of the PEM, such as, equivalent weight (EW), catalyst loading, and electrode composition, for example. A particular combination of PEM characteristics is evaluated and the current density is adjusted accordingly.

A duration of the current operation may be regulated to produce the desired amount of product water, wherein regulation of the current may include an increase in magnitude, a decrease in magnitude, a constant magnitude, and a stopping of current flow. The duration may be predetermined, or the duration may be regulated in response to a High Frequency Response (HFR) signal, for example. As shown in FIG. 2, a frequency response system 70 is adapted to measure the HFR of the fuel cell assembly 54. The frequency response system of the disclosure may be any known device suitable for measuring HFR of fuel cell systems or fuel cell components such as a frequency response analyzer, for example. HFR consists of measuring the changes in electrical impedance of the fuel cell system 10 as an AC signal is applied to the electronic load to modulate a DC load current. The AC signal is typically generated at a particular frequency on the order of 1 kHz. However, it is understood that the AC signal may be varied over a range of frequencies. The resulting magnitude and phase of the AC voltage and current response are measured by the frequency response system 70. The amplitude and phase relationship between this set of signals will yield a wide variety of analytical results such as overall impedance magnitude, for example.

The frequency response system 70 is adapted to measure the HFR across at least one of the PEMs 62 of the fuel cell system 10. As a nonlimiting example, the frequency response system 70 is in independent electrical communication with one or more of the fuel cell assemblies 54 of the fuel cell system 10. The frequency response system 70 is adapted to measure the HFR across at least a portion of the entire fuel cell system 10. As illustrated, the frequency response system 70 is shown in electrical communication with the catalyst layers 64. A skilled artisan should appreciate that other configurations of the frequency response system 70 for measuring the HFR of the fuel cell system 10 may be selected as desired.

Where the duration of the current produced during the current operation is predetermined, the current will be generated for the duration of the current operation to hydrate the PEM 62 to the desired hydration index. For example, if the hydration index of the PEM 62 is 3.5 and the current density during the current operation is 0.02 A/cm² lasting 230 seconds, the PEM 62 is hydrated for 230 seconds before the current operation stops. It is understood that the duration of the current may be regulated by any conventional means such as a manually operation and a controller, for example.

Where the duration of the current is regulated in response to a High Frequency Response (HFR) signal, changes in electrical impedance of the fuel cell system 10 are measured as an AC signal is applied to the electronic load to modulate a DC load current. The HFR signal is measured by the frequency response system 70 and analyzed by an operator. As the hydration of the PEM 62 increases, the HFR value decrease. The duration of the current during the current operation is continued until a desired change in HFR value is reached, indicating that the PEM 62 has reached a hydration index substantially near 9 or the desired hydration. It is understood that the frequency response system 70 may include a controller adapted to regulate the current in response to the HFR signal. By hydrating the PEM 62 to a hydration index substantially near 9, Ohmic losses in the fuel cell system 10 encountered during a start-up operation, especially in cold or freezing conditions, are minimized. Accordingly, power generation is maximized and a warm up time, and a time to reaching drive-away power are minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of operating a fuel cell system, the method comprising the steps of:
    providing a fuel cell stack including a plurality of fuel cell assemblies, each fuel cell assembly having a proton exchange membrane disposed between a plurality of fuel cell plates and a catalyst layer disposed between the proton exchange membrane and at least one of the fuel cell plates;
    purging water from the fuel cell system during a shutdown operation; and
    producing an electric current in the fuel cell system for a finite period of time following the shutdown purge to produce a desired amount of product water sufficient to hydrate the proton exchange membrane to militate against an Ohmic loss across the fuel cell assemblies during a start-up operation of the fuel cell system, without producing product water to a point where the water is overflowing into the catalyst layer.

2. The method according to claim 1, further comprising the step of using a hydration index to measure a hydration of the proton exchange membrane.

3. The method according to claim 2, wherein the current is produced until a desired hydration index of the proton exchange membrane is measured.

4. The method according to claim 3, wherein the desired hydration index is about 9 at a temperature of −20 degree Celsius.

5. The method according to claim 1, wherein the current produced has a current density less than 0.12 A/cm².

6. The method according to claim 5, wherein the current produced during the finite period of time has a current density in the range of 0.02 A/cm² to 0.05 A/cm².

7. The method according to claim 1, wherein the current is produced for a predetermined duration to produce a desired amount of product water.

8. The method according to claim 1, wherein the current produced is regulated in response to a High Frequency Response (HFR) signal indicative of a hydration level of the proton exchange membrane.

9. The method according to claim 8, wherein the current is produced until a desired HFR signal indicative of the hydration of the proton exchange membrane is reached.

10. A method of operating a fuel cell system comprising the steps of:
- providing a fuel cell stack including a plurality of fuel cell assemblies, each fuel cell assembly having a proton exchange membrane disposed between a plurality of fuel cell plates and a catalyst layer disposed between the proton exchange membrane and at least one of the fuel cell plates;
- purging water from the fuel cell system during a shutdown operation;
- producing a current in the fuel cell system for a finite period of time with a current operation following the shutdown purge to produce an amount of a product water sufficient to hydrate the proton exchange membrane, without producing product water to a point where the water is overflowing into the catalyst layer; and
- providing a means for regulating the current flow, wherein the current is regulated in response to a hydration level of the proton exchange membrane.

11. The method according to claim 10, further comprising the step using a hydration index to measure the hydration of the proton exchange membrane.

12. The method according to claim 11, wherein the current is produced until a desired hydration index of the proton exchange membrane is measured.

13. The method according to claim 12, wherein the desired hydration index is approximately 9 at a temperature of −20 degree Celsius.

14. The method according to claim 10, wherein the current produced has a current density less than 0.12 A/cm$^2$.

15. The method according to claim 14, wherein the current produced has a current density in the range of 0.02 A/cm$^2$ to 0.05 A/cm$^2$.

16. The method according to claim 10, wherein the current is produced for a desired duration to produce a HFR signal indicative of the hydration of the fuel cell membrane.

17. A method of operating a fuel cell system comprising the steps of:
- providing a fuel cell stack including a plurality of fuel cell assemblies, each fuel cell assembly having a proton exchange membrane disposed between a plurality of fuel cell plates and a catalyst layer disposed between the proton exchange membrane and at least one of the fuel cell plates;
- purging water from the fuel cell system during a shutdown operation; producing a current in the fuel cell system for a finite period of time with a current operation following the shutdown purge to an amount of a product water sufficient to hydrate the proton exchange membrane, without producing product water to a point where the water is overflowing into the catalyst layer; and
- providing a means for regulating the current, wherein the current is produced for a desired duration to produce a desired amount of product water to achieve a desired hydration index (L) of the proton exchange membrane.

18. The method according to claim 17, further comprising the step using a hydration index to measure a hydration of the proton exchange membrane.

19. The method according to claim 17, wherein the desired hydration index is approximately 9 at a temperature of −20 degree Celsius.

* * * * *